(12) United States Patent
Osselton

(10) Patent No.: US 12,118,412 B2
(45) Date of Patent: Oct. 15, 2024

(54) DATA PROCESSING

(71) Applicant: IOTech Systems Limited, Newcastle upon Tyne (GB)

(72) Inventor: Stephen Osselton, Newcastle (GB)

(73) Assignee: IOTech Systems Limited (GB)

( * ) Notice: Subject to any disclaimer, the term of this patent is extended or adjusted under 35 U.S.C. 154(b) by 117 days.

(21) Appl. No.: 17/126,217

(22) Filed: Dec. 18, 2020

(65) Prior Publication Data

US 2021/0382766 A1 Dec. 9, 2021

(30) Foreign Application Priority Data

Jun. 5, 2020 (GB) .................................... 2008488

(51) Int. Cl.
| | | |
|---|---|---|
| *G06F 9/54* | (2006.01) | |
| *G06F 12/1027* | (2016.01) | |
| *G06F 12/1081* | (2016.01) | |
| *G06F 15/167* | (2006.01) | |

(52) U.S. Cl.
CPC .............. *G06F 9/544* (2013.01); *G06F 9/546* (2013.01); *G06F 12/1027* (2013.01); *G06F 12/1081* (2013.01); *G06F 15/167* (2013.01)

(58) Field of Classification Search
None
See application file for complete search history.

(56) References Cited

U.S. PATENT DOCUMENTS

| | | | | |
|---|---|---|---|---|
| 8,191,078 | B1 * | 5/2012 | Cullen | ................ H04L 67/1095 |
| | | | | 714/4.11 |
| 2003/0144894 | A1 * | 7/2003 | Robertson | .............. G06Q 20/04 |
| | | | | 709/226 |
| 2015/0120854 | A1 * | 4/2015 | Bhat | ..................... H04L 51/226 |
| | | | | 709/207 |
| 2017/0060574 | A1 * | 3/2017 | Malladi | ................... G06F 9/542 |
| 2018/0026942 | A1 * | 1/2018 | De Ligt | ................. H04L 67/12 |
| | | | | 709/245 |

(Continued)

FOREIGN PATENT DOCUMENTS

| | | | | |
|---|---|---|---|---|
| CN | 110008044 A | * | 7/2019 | ............. G06F 9/546 |
| EP | 3489815 A1 | | 5/2019 | |

OTHER PUBLICATIONS

Search Report in UK patent application No. GB2008488.5 dated Oct. 22, 2020.

(Continued)

*Primary Examiner* — Charles E Anya
(74) *Attorney, Agent, or Firm* — Burns & Levinson LLP; Daniel J. McGrath

(57) ABSTRACT

A data processing system comprising a processor and memory and on which is running an operating system. A computer program executable for implementing a control application for controlling an embedded system is loaded in the memory which controls the operating system to instantiate in an operating system memory a plurality of data processing components and a communication component. The communication component is configured to facilitate data communication between the data processing components using a publish-subscribe messaging pattern. The communication component and data processing components are instantiated in a single memory address space.

20 Claims, 3 Drawing Sheets

(56) References Cited

U.S. PATENT DOCUMENTS

2018/0189303 A1* 7/2018 Mankovskii ........... G06Q 10/06
2018/0309831 A1 10/2018 Sherman et al.
2018/0324119 A1 11/2018 Ratinder et al.
2019/0034460 A1* 1/2019 Eberlein ............... G06F 16/213
2019/0041830 A1* 2/2019 Yarvis ................ H04L 67/1051

OTHER PUBLICATIONS

Caprolu et al. "Edge Computing Perspectives: Architectures, Technologies, and Open Security Issues," 2019 IEEE International Conference on Edge Computing (EDGE), 2019, pp. 116-123, doi: 10.1109/EDGE.2019.00035.
Goethals et al. "Unikernels vs Containers: An In-Depth Benchmarking Study in the Context of Microservice Applications," 2018 IEEE 8th International Symposium on Cloud and Service Computing (SC2), 2018, pp. 1-8, doi: 10.1109/SC2.2018.00008.
Gorton et al. "A High-Performance Event Service for HPC Applications," Third International Workshop on Software Engineering for High Performance Computing Applications (SE-HPC '07), 2007, pp. 1-5, doi: 10.1109/SE-HPC.2007.1.

\* cited by examiner

DATA PROCESSING

CROSS REFERENCE TO RELATED APPLICATIONS

This application claims priority to, and the benefit of, UK Patent Application No. GB2008488.5, filed on Jun. 5, 2020 and entitled "Data Processing", the contents of which are incorporated herein by reference in their entirety for all purposes.

TECHNICAL FIELD

The present invention relates to techniques for controlling embedded systems, and in particular embedded systems in which control applications are implemented using data processing components, such as microservice components.

BACKGROUND

The development of distributed computing technology has enabled the remote control and monitoring of objects, equipment and processes containing networked computing devices (often referred to as the internet of things (IoT)) in many different fields.

However, the latency and jitter associated with communicating data across large networks (such as the internet) means, for certain applications, a conventional IoT approach, where a computing device is controlled, over the internet, by another computing device, is not appropriate.

Examples include embedded systems that control industrial processes. This is because such embedded systems often require input data (e.g. sensor data or local control data) to be communicated, processed, and a response generated, with a maximum time delay. This maximum time delay may not be possible to achieve if the processing of this data requires certain data to be communicated to and from a remote computing device over the internet.

However, it is still advantageous to enable IoT techniques to be used to control and monitor these types of industrial processes. For this reason, "edge computing" techniques, facilitated, for example, by open-source platforms such as "EdgeX Foundry", are becoming increasingly popular. Edge computing techniques seek to enable as much of the time-delay sensitive data processing and data storage functions of a system to be implemented close to the point in the network where the related computing activity is occurring, thus reducing latency and jitter, whilst enabling less time-critical functionality, for example system monitoring and high-level control functions, to be performed remotely.

Whilst positioning computing components close to the point in a network where the data processing occurs reduces the effects of data latency and jitter, to implement reliable and safe embedded systems that use edge computing (where much of the monitoring and control may be performed remotely) it is still desirable to improve the data processing predictability of these systems. This data processing predictability is the ability to be confident, that the time taken to perform certain processing tasks will not exceed a predetermined maximum period of time.

Many edge computing systems are based on conventional computing systems which have not necessarily been optimised to provide this predictability. For example, most edge computing technologies, particularly those implemented in embedded systems, use operating systems in which different data processing components (for example microservice components developed in accordance with "loosely-coupled" software architectures) are implemented in different operating system address spaces and that communicate with each other across these address spaces via Inter Process Communication (IPC) using an operating system implemented network stack. This type of implementation makes it harder to be confident that data processing tasks will be completed within a predetermined maximum period of time.

It is an aim of certain embodiments of the invention to provide techniques that improve the predictability which certain processing tasks are undertaken in computing systems such as edge computing systems.

SUMMARY OF THE INVENTION

In accordance with a first aspect of the invention, there is provided a data processing system comprising a processor and memory and on which is running an operating system. A computer program executable for implementing a control application for controlling an embedded system is loaded in the memory which controls the operating system to instantiate in an operating system memory a plurality of data processing components and a communication component. The communication component is configured to facilitate data communication between the data processing components using a publish-subscribe messaging pattern. The communication component and data processing components are instantiated in a single memory address space.

Optionally, the operating system is a real-time operating system.

Optionally, the communication component maintains a plurality of topics, and the data processing components are configured to: transmit data to be processed by other data processing components by publishing data to one of the plurality of topics, and receive data from other data processing components by subscribing to at least one of the plurality of topics.

Optionally, the data processing components are configured to publish data to a given topic by appending a topic identifier to the data and communicate the data appended by the topic identifier to the communication component.

Optionally, the data processing components are configured to subscribe to a given topic by virtue of subscribe data maintained by the communication component, the subscribe data linking topics with one or more data processing components.

Optionally, the communication component is configured to communicate received data associated with a topic to each data processing component that the subscribe data indicates is linked to that topic.

Optionally, the communication component is configured to: allocate a communication priority to each topic, and preferentially communicate data to the data processing components in accordance with the communication priority of the topic with which the data is associated.

Optionally, the data processing system is a multi-core data processing system and the computer program executable is configured to implement a topic-based processor affinity technique by requesting the operating system bind processing tasks associated with one or more specific topics to one or more specific processor cores.

Optionally, the data processing components and communication component are microservice components.

Optionally, the data processing components and communication component are loosely coupled microservice components.

In accordance with a second aspect of the invention, there is provided a method of implementing a control application on a data processing system for controlling an embedded system. The method comprises: loading a computer executable for implementing the control application into a memory of the data processing system; instantiating, by an operating system of the data processing system under the control of the computer executable, a plurality of data processing components and a communication component in a single memory address space of an operating system memory of the operating system, and facilitating, by the communication component, data communication between the data processing components using a publish-subscribe messaging pattern.

Optionally, the operating system is a real-time operating system.

Optionally, the method further comprises: maintaining, by the communication component, a plurality of topics; transmitting, by the data processing components, data to be processed by other data processing components by publishing data to one of the plurality of topics, and receiving, by the data processing components, data from other data processing components by subscribing to at least one of the plurality of topics.

Optionally, the method further comprises publishing, by the data processing components data to a given topic by: appending a topic identifier to the data, and communicating the data appended by the topic identifier to the communication component.

Optionally, the method further comprises: subscribing, by the data processing components, to a given topic by virtue of subscribe data maintained by the communication component, the subscribe data linking topics with one or more data processing components.

Optionally, the method further comprises communicating, by the communication component, received data associated with a topic to each data processing component that the subscribe data indicates is linked to that topic.

Optionally, the method further comprises, by the communication component: allocating a communication priority to each topic, and preferentially communicating data to the data processing components in accordance with the communication priority of the topic with which the data is associated.

Optionally, the data processing system is a multi-core data processing system, said method comprising: implementing, by the computer program executable a topic-based processor affinity technique by requesting the operating system bind processing tasks associated with one or more specific topics to one or more specific processor cores.

Optionally, the data processing components and communication component are microservice components.

Optionally, the data processing components and communication component are loosely coupled microservice components.

In accordance with a third aspect of the invention, there is provided a computer executable for implementing a control application for controlling an embedded system, said computer executable comprising computer readable code configured such that when loaded onto a computing device, controls the computing device to: control an operating system of the data processing system to instantiate a plurality of data processing components and a communication component in a single memory address space of an operating system memory of the operating system, and facilitate, using the communication component, data communication between the data processing components using a publish-subscribe messaging pattern.

In accordance with certain aspects of the invention, a technique is provided for improving the certainty with which data is likely to be processed within a predetermined time period in a data processing system, particularly data processing systems of the type that are implemented in "edge" computing devices forming part of a distributed computing system, for example an "IoT system".

In accordance with certain embodiments of the invention, a computer program executable implementing, for example, a software application, such as a control application for an embedded system, is loaded and run on a data processing system in such a way that data processing components (typically microservices) of the implemented computer program executable are instantiated in the same memory address space, along with a communication component. The communication component enables the memory components to communicate data to and from each other using a publish-subscribe messaging pattern.

By virtue of the fact that a publish-subscribe messaging pattern is used, and that all of the components of the implemented computer program executable (including the communication component) are implemented in the same memory space, the likelihood that data is processed by the software application with a guaranteed level of predictability (for example, responding within a guaranteed maximum period of time to an asynchronous input such as data associated with a sensor reading), is improved.

This improvement is manifest particularly with respect to similar techniques in conventional embedded systems in which different components of an computer program executable are typically distributed across different address spaces and communication of data across these different memory spaces is implemented using a centralised operating system network stack. The time taken to communicate data between components in this way is inherently less predictable as it is harder to determine what other components from other processes might be using the central operating system network stack, or how the operating system might prioritise serving different address spaces. In contrast, by providing a single communication component in the same address space as the data processing components of the computer program executable, time taken for data communication between data processing components is more predictable and can enable developers to be more confident that certain data processing operations will be performed within a guaranteed period of time.

Conveniently, in certain embodiments, when an operating system running on the data processing system is a real-time operating system, "topic"-based messaging associated with publish-subscribe messaging patterns can be used to prioritise the communication of data between the data processing components, by allocating a priority to different topics and by allocating data to particular topics.

Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
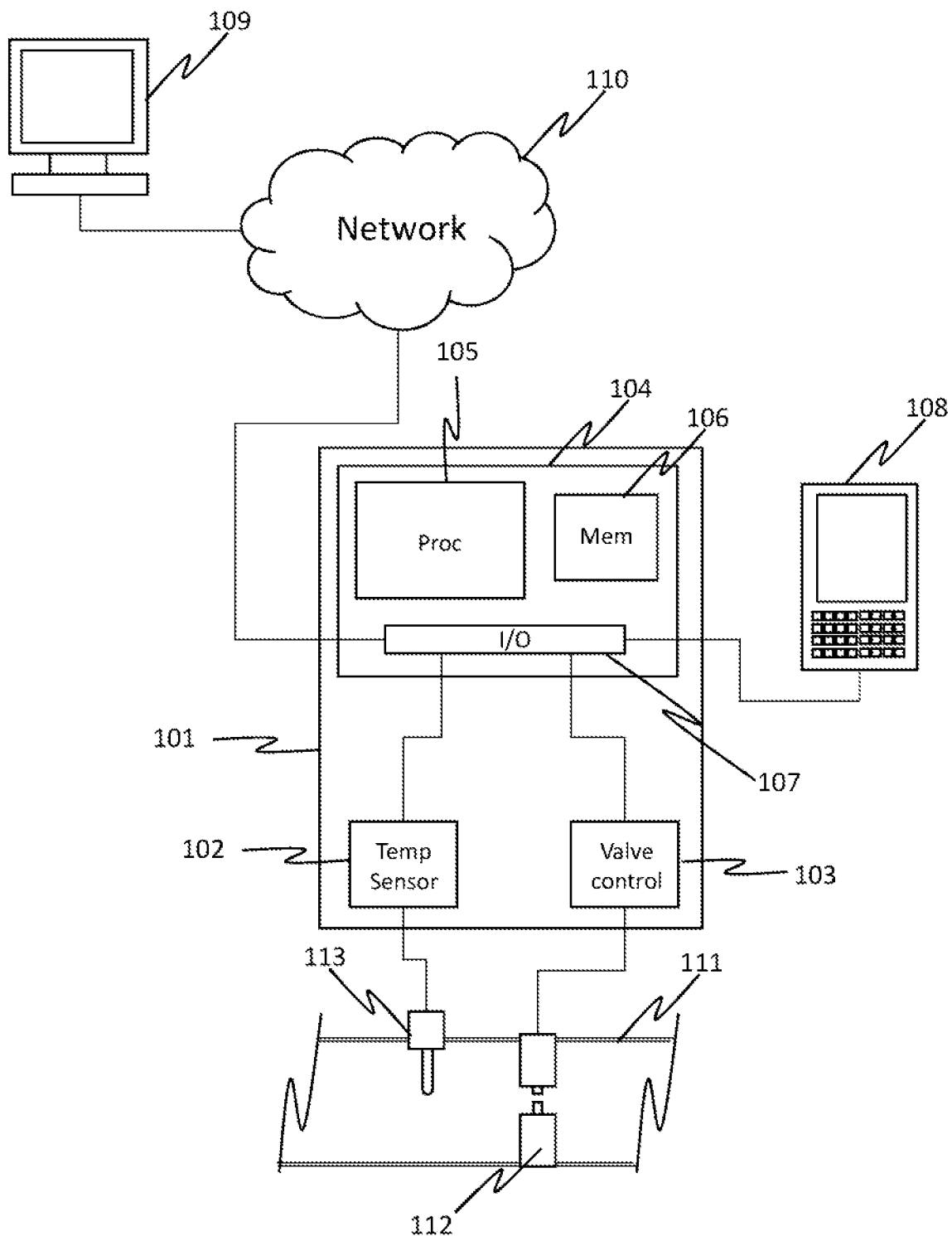
FIG. 1 provides a simplified schematic diagram depicting an example of an internet of things system comprising an embedded system, implemented in accordance with edge computing techniques.

FIG. 1 provides a schematic diagram depicting an illustrative example of an "Internet of Things" system which illustrates a typical setting in which examples of the invention can be implemented.

The system comprises a control system 101 which comprises a sensing device 102 provided by a temperature sensor, a controller device 103 provided by a valve control, and an embedded computer system 104.

The embedded computer system 104 comprises a processor unit 105, memory 106 and an input/output data interface 107.

An external control device 108 is connected directly to the control system 101 via the data interface 107.

A remote information technology (IT) system (an "IT endpoint") 109 is connected to the data interface via a data network 110, provided, for example, by the internet.

The system depicted in FIG. 1 is a simplified example of a typical "Internet of Things" system which is configured to enable a remote IT system to monitor an embedded computer system which, in turn, is configured to control an industrial process.

In the illustrative example depicted in FIG. 1, the embedded computer system 104 is configured to control the flow of fluid through a conduit 111 via a valve 112 connected to the valve control 103 in response to temperature readings generated by a temperature probe 113 connected to the temperature sensor 102.

The embedded computer system 104, configured in this way, is an example of an edge computing system, in which computer operations associated with the control of an industrial process are performed close to the industrial process rather than remotely from a network node separated from the industrial process via a network.

The embedded computer system 104 has running thereon an operating system. Typically, the operating system is a "real-time operating system" (RTOS). RTOS are operating systems configured to undertake and complete processing tasks in accordance with time constraints that specify periods of time within which operations must be performed.

Under the control of the operating system, the embedded computer system has running thereon a computer program (referred to as an "embedded system control application"), in the form of a compiled computer program executable which controls operation of control system 101.

The embedded system control application is configured to process sensor data received from the temperature sensor 102 via the data interface 107 and, responsive to this, generate control data for communicating to the to the valve control device 103, via the data interface 107.

The embedded system control application is further configured to process command data received from the external control device 108 via the data interface 107 and modify the operation of the control system 101 in accordance with the command data.

The embedded system control application is further configured to generate reporting data relating to the operation of the control system 101 for communicating to the remote IT system 109 via the data interface 107 and the data network 110.

In this way, in use, the embedded system control application running on the control system 101 controls the operation of the valve 112 responsive to temperature sensor data detected by the temperature sensor 102. The operation of the control system 101 can be modified by the external control device 108. Reporting data, relating to the operation of the valve and temperature sensor is communicated to the remote information technology system 109.

Figure 2:
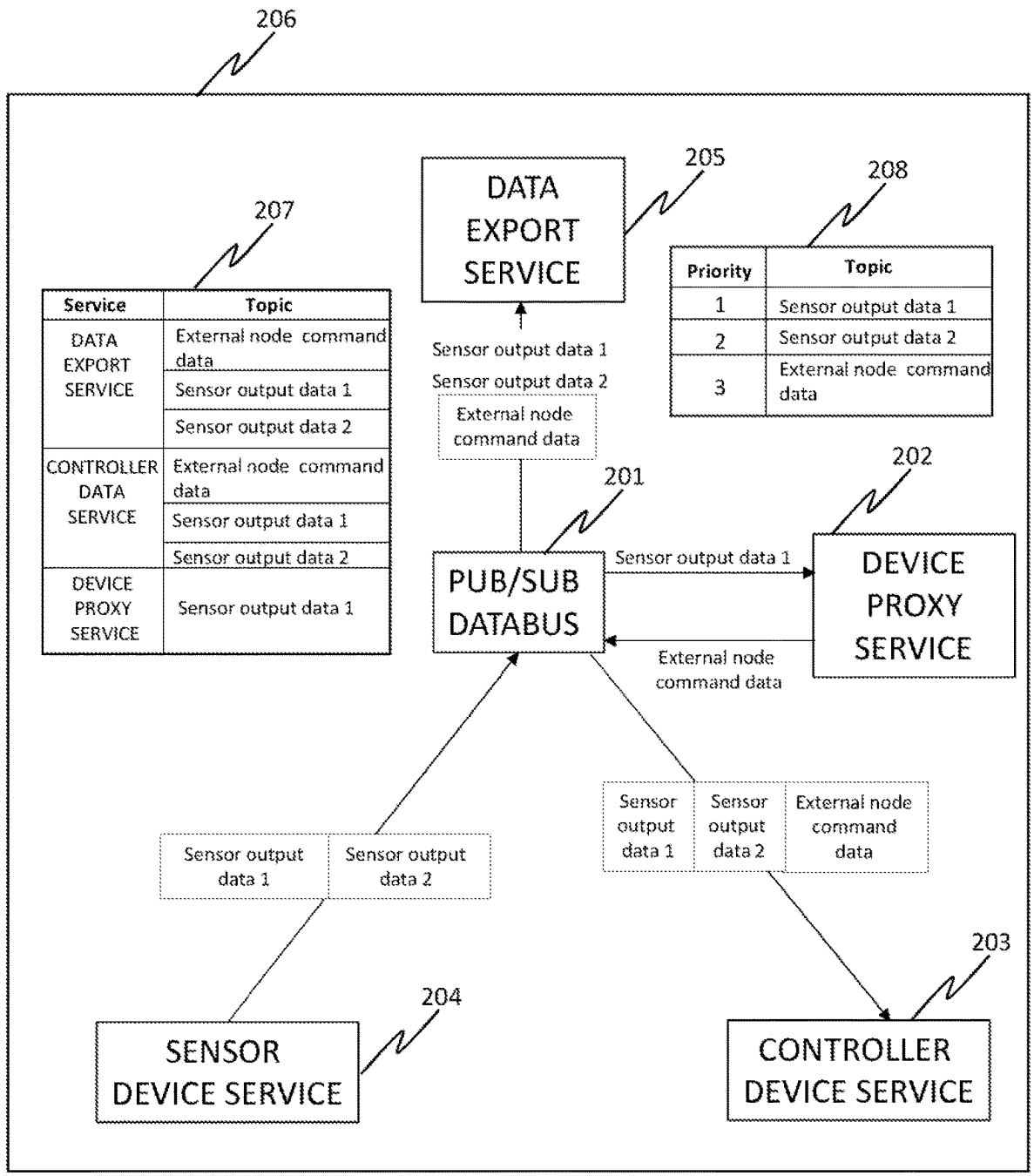
FIG. 2 provides a schematic diagram depicting a control application implemented in accordance with certain embodiments of the invention.

FIG. 2 provides a schematic diagram showing how an embedded system control application of the type described with reference to FIG. 1 can be implemented in accordance with an embodiment of the invention. In particular FIG. 2 shows an arrangement of data processing components of the embedded system control application when loaded into the operating system memory of the embedded computer system 104.

In keeping with conventional embedded system software, the embedded system control application is divided into a plurality of data processing components (for example "microservice" components) which are logical components of the embedded system control application, each typically responsible for a discrete aspect of the functionality provided by the embedded system control application and each typically allocated a memory location in the operating system memory.

As shown in FIG. 2, in accordance with certain embodiments of the invention, the components of the embedded system control application, when loaded into memory, provide a plurality of discrete microservice components 201, 202, 203, 204, 205, co-located in a single address space 206 of the operating system memory. As is known in the art, a single address space is a continuous range of valid addresses in the operating system memory that the operating system allocates to the embedded system control application.

The microservice components are typically "loosely coupled", that is, they are developed in such a way that each microservice component is not co-dependent on the implementation of any of the other microservice component. That is, a given microservice component does not rely on any other microservice component to function correctly.

In the example shown in FIG. 2, the microservice components include a pub/sub databus 201. The pub/sub databus 201 is configured to implement a publish/subscribe communication mechanism enabling the microservice components 202, 203, 204, 205 to communicate data to and from each other using a publish/subscribe communication protocol.

Pub/sub databuses are well-known in the art and the skilled person will be familiar with how they provide a communication mechanism that enables data to be communicated in accordance with a publish-subscribe messaging pattern.

In the example shown in FIG. 2, a second microservice component 202 provides a device proxy service for controlling operations associated with receiving data from, and sending data to, the external control device 108.

In the example shown in FIG. 2, a third microservice component 203 provides a controller device service for controlling operations associated with controlling the operation of the controller device 103.

In the example shown in FIG. 2, a fourth microservice component 204 provides a sensor device service, for controlling operations associated with receiving data from the sensor device 102.

In the example shown in FIG. 2, a fifth microservice component 205 provides a data export service for controlling operations associated with communicating data to the IT end point 109.

The pub/sub databus 201 manages a plurality of "topics" which provide a number of logical channels via which data can be communicated between the microservice components 202, 203, 204, 205.

To transmit data on a given channel, a microservice component "publishes" data to a corresponding topic. To receive data transmitted on a given channel, the microservice component "subscribes" to the corresponding topic.

Publishing data to a topic is achieved by a microservice component communicating data to the pub/sub databus 201 appended with a topic identifier.

Subscribing to a topic is achieved by the pub/sub databus 201 maintaining a record (subscribe data) of all the microservice components that subscribe to each topic. The pub/sub databus 201 forwards data to all the microservice components subscribed to a topic when data is received appended with a corresponding topic identifier.

The topics to which a microservice component subscribes are typically defined when the embedded system control application code is being developed (written) or at runtime through configuration.

For example, the temperature sensor 102 may be configured to generate two types of sensor data. A first type of data corresponds to a fault-state of the sensor, e.g. indicating whether the sensor is detecting temperature or has ceased to detect temperature and therefore is in a fault condition. A second type of sensor data corresponds to a detected temperature.

Accordingly, the pub/sub databus 201 is configured to establish a first "topic" for data relating to the fault-data (sensor output data 1) and a second "topic" for data relating to the detected temperature (sensor output data 2). The pub/sub databus 201 is configured to establish a third "topic" for data relating to commands received from the external control device 108 (external node command data).

The controller device service 203 and data export service 205 are configured to subscribe to the first topic (sensor output data 1), second topic (sensor output data 2) and third topic (external node command data). The device proxy service 202 is configured to subscribe to the first topic (sensor output data 1). These relationships are maintained by the pub/sub databus 201 as "subscribe data" 207 stored in a suitable memory location.

The device proxy service 202 is configured to publish data relating to commands received from the external control device 108 to the third topic (external node command data).

The sensor device service 204 is configured to publish data relating to the fault-state of the temperature sensor to the first topic (sensor output data 1) and publish data relating to the detected temperature to the second topic (sensor output data 2).

In this illustrative example, the embedded system control application is configured to control the operation of the valve 112 such that the degree to which it is opened or closed is dependent on the temperature detected by the temperature sensor. In the event that a fault is detected with the temperature sensor, the embedded system control application is configured to shut the valve. This functionality is enabled because the control device service 203, which, controls operations associated with controlling the valve control 103, subscribes to the sensor output data 1 topic and sensor output data 2 topic and therefore receives data published by the sensor device service 204 relating the detected fault-state of the temperature sensor and data published by the sensor device service 204 relating to the temperature detected by the temperature sensor 102. Accordingly, the controller device service 203 can control the valve in accordance with the detected fault-state of the temperature sensor and the temperature detected by the temperature sensor 102.

Further, in this illustrative example, changes in the way the embedded system control application controls the valve (for example, the relationship between detected temperature and the degree to which the valve is open) can be made by an operator inputting corresponding control information into the external control device 108. This functionality is enabled by virtue of the fact that the control device service 203, subscribes to external node command data topic and therefore receives data published by the device proxy service 202 relating to commands entered by a user into the control device 108. Accordingly, the controller device service 203 can update the way in which the valve is controlled in accordance with the commands input by the user.

Further, in this illustrative example, data relating to the operation of the control system 101, that is the detected temperature, data relating to temperature sensor faults, and data relating to the command data received from the external control device, are communicated from the control system 101 to the IT end point 109. This functionality is enabled by virtue of the fact that the data export service 205, which controls operations associated with communicating data to the IT end point 109 subscribes to the sensor output data 1 topic and sensor output data 2 topic and the external node command data topic.

In certain embodiments, the pub/sub databus 201 is configured to prioritise the transmission of data between the microservices of the embedded system control application based on the topics for ensuring that data is communicated depending on with what priority it needs to be processed by the system.

For example, in an illustrative example, it may be important that if a fault occurs with the temperature sensor, the valve is closed as quickly as possible. Moreover, updating the operation of the control system 101 in accordance with commands input by a user may be considered to be of a lower priority than controlling the operation of the valve in accordance with the detected temperature.

Thus, the communication of fault-data (sensor output data 1) to the control device service 203 is to be prioritised over the communication of the data relating to the detected temperature (sensor output data 2) and data relating to commands received from the external control device 108 (external node command data). Further, the communication of data relating to the detected temperature (sensor output data 2) is to be prioritised over data relating to commands received from the external control device 108 (external node command data).

To implement this data transmission priority mechanism, the pub/sub databus 201 maintains a topic priority configuration 208 which associates a priority with each topic. The pub/sub databus 201 will forward data to the microservices in an order that reflects this priority.

For example, data relating to the first topic (sensor output data 1) will be forwarded by the pub/sub databus 201 to subscribers of that topic once it has been published to that topic by a microservice, irrespective of any pending data relating to the other two topics waiting to be forwarded to the relevant subscribers. Data relating to the second topic (sensor output data 2) will be forwarded to subscribers of that topic by the pub/sub databus 201 providing there is no pending data relating to the first topic (sensor output data 1) to be forwarded. Data relating to the third topic (external node command data) will be forwarded to subscribers of that topic by the pub/sub databus 201 providing there is no pending data relating to either the first topic (sensor output data 1) or the second topic (sensor output data 2) to be forwarded.

In certain embodiments the embedded system control application can be configured so that when run on an embedded system with a multi-core processor, a topic-based processor affinity technique is implemented using the topics as a basis to bind particular processing tasks to specific processor cores. Specifically, the control application when run, requests the operating system to allocate one or more specific processors of a multi-processor core to processing tasks (i.e. computing processes) associated with specific topics.

For example, with reference to the example shown in FIG. 2, in an embedded system comprising two processor cores, the control application may specify that the processing tasks associated with the first topic (sensor output data 1) and the processing tasks associated with the second topic (sensor output data 1) are run on a first processor core, and the processing tasks associated with the third topic (external node command data) are run on either the first processor core or the second processor core.

In this way, the processing tasks associated with higher priority topics (e.g. the first topic (sensor output data 1) and the second topic (sensor output data 1)) can be processed by the embedded system preferentially by ensuring that they are handled by a dedicated processor core. Whereas lower priority processing tasks associated with lower priority topics (e.g. the third topic (external node command data)), can be handled less preferentially by allowing them to be processed by any available processor core or across multiple processor cores.

The implementation of the embedded system control application described with reference to FIG. 2 is a simple example of an embodiment of the invention with a limited number of microservice components implementing a very simple control application for controlling a very simple system comprising only two components: a temperature sensor and a valve. Other embodiments may include many more microservice components performing many other different functions for controlling much more complex systems, for example industrial systems.

Applications for running on embedded systems are normally developed using specific software tools developed specifically for this purpose. The embedded system control application, the implementation of which is depicted in FIG. 2, can be generated in any suitable way but is typically generated using such an embedded system software development tool.

Such development tools are normally run on a developer's computing device (e.g. personal computer) and enable a developer to generate embedded systems applications by creating application code, compiling the application code, and then exporting the compiled code (normally in the form of a computer program executable) for loading onto an embedded computing system.

Such development tools typically include code editors enabling original code to be written. They also typically provide access to code repositories containing pre-developed code enabling a developer to incorporate pre-developed sections of code into new code that is being written. Such tools are typically configured to enable a developer to write code in a particular language (for example C or C++) but may also provide functionality that enables certain functionality to first be developed in a higher-level language such as MATLAB or Simulink and then transpiled into a suitable "lower-level" language, such as C.

In the context of the present invention, an otherwise conventional embedded software development platform is provided that is configured to enable a developer to generate embedded system applications of the type described above. That is, applications which when loaded onto a suitable embedded computer system comprise microservice components, including a pub/sub databus microservice component that are instantiated in the same single address space of the operating system. In order to achieve this, the embedded software platform.

Figure 3:
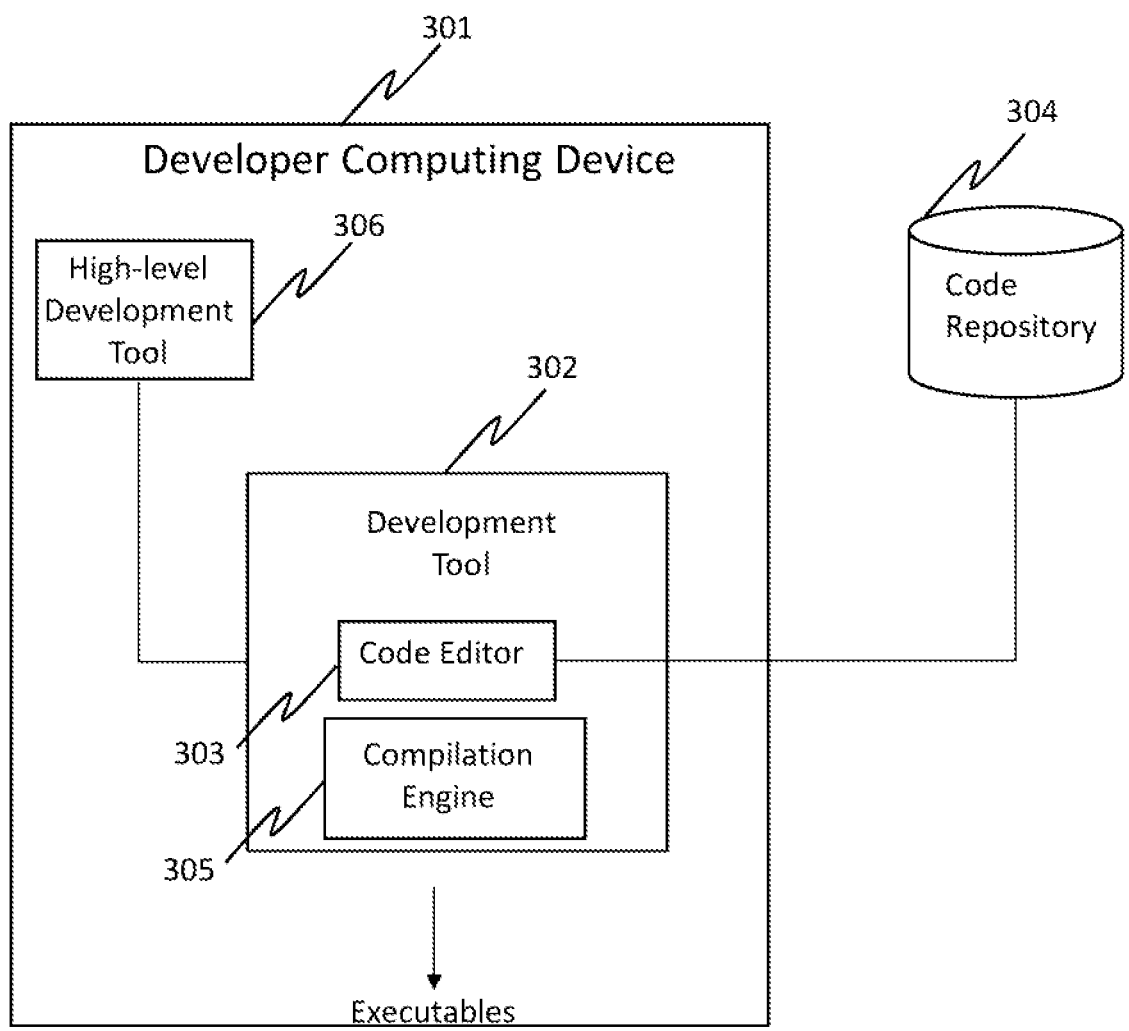
FIG. 3 provides a schematic diagram depicting a development environment for generating application code in accordance with certain embodiments of the invention.

FIG. 3 provides a simplified schematic diagram depicting a system in which such a development tool is implemented.

A developer computing device 301, such as a personal computer, on which is running an embedded system development tool 302 is provided. As discussed above, amongst other functions, the embedded system development tool 302 includes a code editor 303 enabling code to be written. The embedded system development tool 302 also includes an interface for downloading pre-developed code from a code repository 304 so such pre-developed code can be incorporated with the code being developed using the code editor 303. The embedded system development tool 302 includes a compilation engine 305 for compiling the code and outputting a computer program executable for loading on an embedded system. In the example shown in FIG. 3, the developer computing device 301 also has running thereon software providing a high-level development tool 306 enabling code to be initially developed in a higher-level language.

To generate an embedded system control application computer program executable in accordance with embodiments of the invention, the development tool 302 is used by a developer to generate code defining a plurality of microservice components and a pub/sub databus component. The developer can generate such code by writing code using the code editor 303, incorporating pre-developed code downloaded from the code repository 304 and by using the high-level development tool 306 to generate high-level code and then transpile this to lower-level code in which the rest of the code is written. When the code is complete (for example, after, error checking, testing and debugging etc), the code is compiled by the compilation engine 305 which generates an output control application computer program executable file. This output control application computer program executable file can then be loaded, by any suitable means, into the memory of an embedded computing system and then executed by the embedded computing system.

As described above, the output control application computer program executable file generated by the development tool is such that when run under the supervision of an operating system of an embedded computing system, the microservice components are instantiated in a single memory address space of the operating system, and data is communicated between the microservice components by means of a microservice component providing a pub/sub databus.

As described above, in accordance with certain embodiments of the invention a computer program executable implementing an embedded system control application is provided which when loaded into the memory of the operating system of an embedded computer system provides a plurality of microservice components including a pub/sub microservice component.

However, in alternative the data components may not be provided by microservice components (that is data processing components developed in accordance with "microservice" software design principles), but may instead be provided by data processing components developed using equivalent or similar design principles.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A data processing system comprising:
  a processor and memory and on which is running an operating system, wherein a computer program executable for implementing a control application for controlling an embedded system is loaded in the memory which controls the operating system to instantiate in an operating system memory a plurality of data processing components and a communication component, wherein said communication component is a pub/sub databus and is configured to facilitate data communication between the data processing components using a publish-subscribe messaging pattern, and wherein the plurality of data processing components are sensor device services; and
  said communication component and data processing components are instantiated and co-located in a single memory address space, wherein the single memory address space is a continuous range of valid addresses in the operating system memory that the operating system allocates to the embedded system control application.

2. The data processing system according to claim 1, wherein the operating system is a real-time operating system.

3. The data processing system according to claim 2, wherein the communication component maintains a plurality of topics, and the data processing components are configured to:
  transmit data to be processed by other data processing components by publishing data to one of the plurality of topics, and receive data from other data processing components by subscribing to at least one of the plurality of topics.

4. The data processing system according to claim 3, wherein the data processing components are configured to publish data to a given topic by appending a topic identifier to the data and communicate the data appended by the topic identifier to the communication component.

5. The data processing system according to claim 4, wherein the data processing components are configured to subscribe to a given topic by virtue of subscribe data maintained by the communication component, the subscribe data linking topics with one or more data processing components.

6. The data processing system according to claim 5, wherein, the communication component is configured to communicate received data associated with a topic to each data processing component that the subscribe data indicates is linked to that topic.

7. The data processing system according to claim 6, wherein the communication component is configured to:
  allocate a communication priority to each topic, and preferentially communicate data to the data processing components in accordance with the communication priority of the topic with which the data is associated.

8. The data processing system according to claim 3, wherein the data processing system is a multi-core data processing system and the computer program executable is configured to implement a topic-based processor affinity technique by requesting the operating system bind processing tasks associated with one or more specific topics to one or more specific processor cores.

9. The data processing system according to claim 1, wherein the data processing components and communication component are microservice components.

10. The data processing system according to claim 9, wherein the data processing components and communication component are loosely coupled microservice components.

11. The method of implementing a control application on a data processing system for controlling an embedded system, said method comprising:
- loading a computer executable for implementing the control application into a memory of the data processing system;
- instantiating, by an operating system of the data processing system under the control of the computer executable and in a single memory address space of an operating system memory of the operating system, a plurality of data processing components and a communication component co-located in the single memory address space, wherein the plurality of data processing components are sensor device services and the communication component is a pub/sub databus, and wherein the single memory address space is a continuous range of valid addresses in the operating system memory that the operating system allocates to the embedded system control application; and
- facilitating, by the communication component, data communication between the data processing components using a publish-subscribe messaging pattern.

12. The method according to claim 11, wherein the operating system is a real-time operating system.

13. The method according to claim 12, comprising:
- maintaining, by the communication component, a plurality of topics; transmitting, by the data processing components, data to be processed by other data processing components by publishing data to one of the plurality of topics; and
- receiving, by the data processing components, data from other data processing components by subscribing to at least one of the plurality of topics.

14. The method according to claim 13, comprising publishing, by the data processing components data to a given topic by:
- appending a topic identifier to the data, and communicating the data appended by the topic identifier to the communication component.

15. The method according to claim 14, comprising subscribing, by the data processing components, to a given topic by virtue of subscribe data maintained by the communication component, the subscribe data linking topics with one or more data processing components.

16. The method according to claim 15, comprising communicating, by the communication component, received data associated with a topic to each data processing component that the subscribe data indicates is linked to that topic.

17. The method according to claim 16, comprising, by the communication component:
- allocating a communication priority to each topic, and preferentially communicating data to the data processing components in accordance with the communication priority of the topic with which the data is associated.

18. The method according to claim 13, wherein the data processing system is a multi-core data processing system, said method comprising:
- implementing, by the computer program executable a topic-based processor affinity technique by requesting the operating system bind processing tasks associated with one or more specific topics to one or more specific processor cores.

19. The method according to claim 11, wherein the data processing components and communication component are loosely coupled microservice components.

20. A computer executable for implementing a control application for controlling an embedded system, said computer executable comprising:
- computer readable code configured such that when loaded onto a computing device, the computing device is controlled to:
  - control an operating system of the data processing system to instantiate, in a single memory address space of an operating system memory, a plurality of data processing components and a communication component co-located in the single memory address space, wherein the plurality of data processing components are sensor device services and the communication component is a pub/sub databus, and wherein the single memory address space is a continuous range of valid addresses in the operating system memory that the operating system allocates to the embedded system control application and
  - facilitate, using the communication component, data communication between the data processing components using a publish-subscribe messaging pattern.

* * * * *